United States Patent Office 2,868,646
Patented Jan. 13, 1959

2,868,646

EFFERVESCENT DRINK CONCENTRATE AND METHOD OF MAKING SAME

Abraham Schapiro, Kentfield, Calif., assignor to The Shasta Water Company, San Francisco, Calif., a corporation of California No Drawing. Application July 24, 1953
Serial No. 370,218

36 Claims. (Cl. 99—78)

This invention relates to stable, dry, granular compositions in concentrate form, suitable for the preparation of effervescent drinks, particularly of the soft drink variety. It also relates to methods of preparing the stable, granular concentrates.

The effervescent drinks are produced from the stable, dry, granular concentrates of the present invention by stirring the same in water, particularly cold water (about 35°–40° F.). The resulting drinks have a clarity, sparkle and taste at least comparable to the common bottled, carbonated soft drinks presently available commercially. The effervescence initiated on stirring the dry granular concentrate in water continues without substantial diminution during the normal period of consumption, and the aforesaid clarity, sparkle and taste are maintained throughout this same period.

The dry granular concentrate of the present invention, in its preferred aspect, comprises an intimate, homogeneous, free flowing mixture of two dry constituents: (1) a sugar-acid crystal blend or core, preferably a mixture of sucrose sugar and acid crystals, uniformly colored and flavored by, and encased in, a readily water-soluble hull or casing comprising a mixture of an edible, water-soluble or dispersible film-forming colloid or gum, a monosaccharide sugar, coloring and flavoring materials, and (2) a sugar-carbonate crystal blend or core, preferably a mixture of sugar and carbonate crystals, uniformly colored by, and encased in, a readily water-soluble hull or casing comprising a mixture of an edible, water-soluble or dispersible film-forming colloid or gum, a monosaccharide sugar and a coloring material. In the main, the cores of the dry constituents consist essentially of a physical mixture of the crystals making up the cores; however, some cores consist solely of sugar crystals or of acid crystals or of carbonate crystals.

The monosaccharide tends to make the hull or casing adhere more tenaciously to the crystal cores and also tends to make the hull or casing more soluble in cold water and thereby quickly release the crystal cores for solution and reaction in the water. While the use of the monosaccharide is preferred, it may be omitted.

In accordance with the present invention, the sugar-acid crystal blend and the sugar-carbonate crystal blend are made separately in a dry granular state and the dry granules are then placed in homogeneous admixture in any desired manner, as in a conventional powder mixing machine, and then coated. The character and details of the constituents of the two crystal blends and of their methods of manufacture will now be described.

The sugar-acid crystal blend is formed by preliminarily mixing, in a dry state, a sugar or a mixture of sugars and an edible organic acid or mixture of such acids. The sugar is in the form of granules of the size corresponding to the commercial form of granulated sugar (sucrose) and the crystals of organic acid are preferably of the same or a closely similar size. The sugar constituent may be either a monosaccharide such as dextrose, for example, or a disaccharide such as sucrose, for example, or any mixture of such sugars. Preferred sugar mixtures are sucrose and lactose or dextrose. The sucrose-lactose mixture is particularly preferred because the lactose aids in forming a uniform mixture of the sucrose and the edible organic acid and because it adds stability and shelf life to the final product. In general, the choice of the sugar or mixture of sugars used is dependent upon the ultimate taste desired in the product. For example, if sweetness is objectionable, the sucrose can be replaced entirely with lactose or a mixture of lactose and dextrose. While the sugar constituent of the sugar-acid crystal blend may be either a monosaccharide such as dextrose or a disaccharide such as sucrose, it will be understood that more of the dextrose than of the sucrose would be required to give the desired sweetness, as is well understood in the art.

Dextrose is the preferred monosaccharide; however, glucose, levulose, galactose and other monosaccharides, alone or in admixture, may be used in accordance with the present invention. Sucrose is the preferred disaccharide in accordance with the present invention. Other disaccharides such as maltose, trehalose, melibiose, etc., or mixtures thereof including sucrose, may, of course, be used.

The edible organic acid is preferably citric acid. Other normally crystalline edible organic acids which may be used are tartaric and malic acids, either in anhydrous or hydrated state. A mixture of edible organic acids may be used, if desired. All or part of the edible organic acid may be replaced with an inorganic acid such as phosphoric acid, for example, but this is not preferred.

The quantity of crystal sugar with respect to the edible acid which may be used in making the sugar-acid crystal blend may vary rather widely. For example, there may be from about 3 to 10 parts by weight of crystal sugar to 1 part by weight of edible organic acid. A preferred proportion in the case of the preferred sucrose-citric acid blend is about 4 parts by weight of sucrose and 1 part by weight of citric acid. Where it is desired to use lactose in the sucrose-citric acid blend, the lactose content may vary from about 0.3 to 1 part by weight per unit weight of acid, preferably about 0.5 part by weight. As is apparent, the proportion of sugar to acid may be varied to obtain any desired sweetness in the final beverage.

It is to be understood that there must be a definite relationship between the amount of edible acid in the sugar-acid crystal blend and the carbonate in the sugar-carbonate crystal blend to be hereinafter described. Thus there should be at least enough acid to react chemically with the carbonate to effect a full release of carbon dioxide therefrom. It is preferred that there be an excess of acid used since for a properly palatable beverage, it is necessary to maintain in the beverage an acidity not only during the neutralization reaction, but during the time interval that the beverage is normally consumed. This excess of acid supplies the tartness characteristic of soft drinks. Some or all of this tartness may be due to an inorganic acid, as noted above.

The sugar and acid constituents are mixed dry into homogeneous form and are then wetted down with a solution or a dispersion of a film-forming material which forms a readily water-soluble, protective hull or casing about the sugar-acid mixture. The film-forming materials which may be used are, suitably, aqueous dispersions of an extract of the yucca plant or aqueous dispersions of other non-toxic saponins, gum tragacanth, gum arabic, Irish moss, alginates, gelantin and other similar water-soluble colloids or gums. The choice of the film-forming material depends in part upon the color, taste and/or flavor quality desired in the finished product. The preferred film-forming materials are a 60% (solids) aqueous dispersion of the saponin extract of the yucca plant and mixtures thereof, in all proportions, say 50–50 on a dry weight basis with glycyrrhizin (licorice). These film-forming materials not only supplement the foaming action developed by the reaction between the carbonate in the sugar-carbonate crystal blend and the acid in the sugar-acid crystal blend when the blends are mixed in water, but preliminarily delay this foaming action and thereafter maintain it fairly uniform. The net effect of the saponin on the foaming action is to prolong it and maintain it fairly uniform during the time it normally takes to consume the beverage. These features are particularly desirable and have not heretofore been obtained in an effervescent beverage, insofar as I am aware.

The film-forming material is preferably used in admixture with an aqueous solution of a monosaccharide such as glucose, dextrose, levulose, galactose, etc., dextrose being preferred since it may be used in the form available commercially as refined corn syrup. This syrup is approximately a 70% (solids) aqueous dispersion of the corn sugar. Where it is desired to make a root beer drink, the refined corn syrup of commerce may be replaced by a caramel-colored syrup such as caramelized commercial refined corn syrup. The film-forming material in aqueous dispersion form and the corn syrup or other monosaccharide solution are preliminarily blended. Blending of preformed aqueous dispersions is preferred. The proportions of these constituents, on a dry weight basis, may be varied widely, say from 1 part by weight of the film-forming material to 10 or more parts of the monosaccharide. Preferably, the proportion of the latter should vary from 2 to 6 times by weight of the proportion of the former. In the case of a wetting-down blend of a 60% aqueous extract of the yucca plant and of the aforesaid commercial corn syrup, it is preferred that there be blended 1 part by weight of the aqueous yucca extract and 3 parts by weight of the commercial corn syrup. As noted above, the monosaccharide may be omitted and the wetting-down or coating composition may contain only the film-forming material and the coloring material dissolved or dispersed in a liquid medium, suitably water. The quantity of this wetting-down mixture with respect to the crystal sugar and citric acid constituents of the sugar-acid crystal blend may vary widely. In general, the quantity of this wetting-down mixture used should be sufficient to form an adherent shell or a coating about the crystals of sugar and of acid. Based on the dry weight of the sucrose in the sugar-acid crystal blend, the quantity of the wetting-down blend used (wet basis) may vary from 4% to 15% by weight. For most purposes, approximately 5% to 10% by weight is sufficient.

The amount of water in the wetting-down (coating) composition is in the order of about 2 to 5% by weight, based on the weight of the sugar and acid. This amount may vary but it should be limited to an amount which is insufficient to destroy the crystalline character of the sugar and acid crystals, since it is desired to preserve this crystalline structure into the final product. The coated crystals of sugar and acid are in a slightly moistened state and are somewhat tacky. They can be formed readily by hand into a self-sustaining compact which can be broken readily between the fingers. The water in the coating composition serves only as a vehicle for the coating constituents of the coating composition.

The dry mixture of the crystal sugar and the edible organic acid are wetted-down, i. e. coated, with the wetting-down mixture in a mulling machine or other suitable apparatus which will insure the coating of the sugar-acid crystals with the aqueous film-forming materials. A portion of the coloring material which is to be used in making the beverage from the dry ingredients of the present invention is added to the mixture in the mulling machine and is worked into the mixture. It is important that the crystals of the sugar and of the acid be uniformly colored to insure that they will not present an unsightly variegated appearance in the package or while being dissolved in the water and that they will not produce striations of variegated colored water during solution and reaction with the bicarbonate. A portion of the flavoring material which is to be used in making the dry ingredients of the present invention is also added to the mixture in the mulling machine and is worked therein. In this stage of the operation all of the natural flavoring materials, if they are to be used, are incorporated. In general, the less volatile, more stable flavoring materials are added to the ingredients in this stage of the operation.

The coloring and flavoring materials may be added to the mixture in the mulling machine in any suitable form. Thus they may be added in dry form, or they may be added in liquid form such as in aqueous solution or dispersion form or in the form of alcohol or propylene glycol solutions. The addition of the coloring and flavoring materials in dry form is preferred. Only relatively small amounts of these materials are required and it is important that when they are added in liquid form the quantity of liquid vehicle be kept to a minimum so that the crystalline character of the sugar and of the acid be maintained. Up to this stage of beverage manufacture dissolution of the crystals should be avoided.

The less volatile, more stable flavoring materials which are added to the constituents in this stage of the operation may be aqueous or alcohol extracts of various plants, fruits, herbs and roots such as birch-bark, wintergreen, sassafras, licorice, Jamaica ginger, spinkenard, sarsaparilla, hops, etc., or they may be alcohol or propylene glycol solutions of pure vanilla or of vanillin.

The crystals of sugar and of edible organic acid are mulled with the wetting-down, film-forming mixture until all of the constituents are in homogeneous admixture and the crystals completely and uniformly coated. The wetted mixture is then removed from the mulling machine and is placed on a tray or endless belt and spread out into a layer of a thickness of about ½ to ¾ of an inch, and then dried under infrared lamps or other suitable source of heat, preferably avoiding a temperature rise in the layer to above about 120° F. It is preferred that the wetted mixture be dried at a temperature of about 70° to 110° F. and as rapidly as possible to avoid destruction of the crystal structure of the acid and sugar. This may be effected under infrared lamps as by blowing air over the layer of material being dried or by passing the wetted mixture on an endless belt under a battery of infrared lamps while gently turning the mass over to expose new surfaces to the heat from the lamps. The total heating time should be maintained at a minimum, preferably less than 15 minutes, say 1 to 10 minutes, to avoid destruction of the crystals of sugar and of acid. Flash drying may be used. If desired, the drying atmosphere may be dehumidified air or a non-oxidizing atmosphere. Whether the drying atmosphere is air or substantially inert, it is desirable that it be substantially free from moisture. This, however, is not essential.

It is important that the coated crystals of sugar and of edible organic acid be dried at a temperature below about 130°–140° F., since at about these temperatures and at higher temperatures, the flavoring material which has been added with the wetting-down materials is volatilized and becomes lost. Additionally, when these higher temperatures have been used for any substantial period of time, the resulting dried mass is characterized by a loss of the crystalline structure of the crystals of sugar and acid and by an objectionable glassiness, at least in spots, which results from melting of the materials undergoing drying. The melted product on drying is brittle and when powdered, excessive fines or dust are formed. It is important that the drying temperature be maintained below the melting point of the mixture being dried. With a rapid drying of the wetted mixture at temperatures below about 120° F., the dried material is friable and agglomerated particles crumble readily between the fingers.

The resulting dried mass is crumbled to a size substantially comparable to the size of the starting sugar crystals. This, as pointed out above, is a size comparable to the granulated sucrose sugar used in the household. Each of these dried particles consists essentially of a core comprising a mixture of sugar and edible organic acid crystals or of sugar crystals or acid crystals, colored and flavored by, and encased in, a shell or casing of a water-soluble mixture of an edible, film-forming colloid or gum, a monosaccharide sugar, coloring and flavoring materials. The dried particles are free flowing and they have little tendency to cake on standing. The caked particles crumble readily. The dried particles do not disintegrate when held in moist atmospheres such as are encountered in many homes. This I attribute to the protective character of the casing which remains remarkably stable except when brought into contact with a body of water sufficient in amount to dissolve the casing. The casing serves the further function of binding to itself the flavoring materials and thereby preventing their release before dissolution of the casing. The casing dissolves readily in cold water and quickly releases the coloring and the bound flavoring materials, the sugar and the edible acid crystals, the latter for reaction with the released carbonate crystals from the coated sugar-carbonate crystal blend now to be described, to form a stable creamy foam.

The sugar-carbonate crystal blend is prepared by admixing an inorganic carbonate and a sugar (a monosaccharide, disaccharide, or a mixture thereof as described above). The carbonate constitutent is in the form of crystals of substantially the same size as the sugar constituent. Again, the approximate size of these crystals is comparable with the granulated sugar of commerce. Approximately 0.8 to 1.2 parts by weight of the carbonate per part of acid are blended with the balance of the sugar requirements for the beverage. Where 4 parts by weight of sugar is used in the sugar-acid crystal blend, approximately 8 to 12 parts of sugar are used in the sugar-carbonate crystal blend. In general, the proportion of carbonate which is used in the blend will vary from beverage to beverage, in order to maintain the acidity necessary to insure the desired palatability for that beverage after the neutralization reaction has taken place and until the beverage is consumed. Thus where a tart taste is desired in the beverage, as in the case of a lemon flavor, for example, the amount of carbonate used will be the lower limit of the range indicated above, namely, it will be in the order of about 0.8 part of carbonate to 1 part of acid, by weight. On the other hand, in the case of a root beer beverage, the carbonate content will be in the upper end of the range, namely, it will be in the order of about 1.2 parts of carbonate to 1 part of acid, by weight. Beverages of other flavors will have, in general, varying amounts of the carbonate in the composition within the limits recited, namely, between about 0.8 part to 1.2 parts by weight per part of acid.

Sodium bicarbonate is the preferred carbonate in accordance with the present invention. Other non-toxic alkali metal and alkaline earth metal bicarbonates may be used in lieu of sodium bicarbonate, as is well understood in the art. The dry mixture of the carbonate and of the sugar is wetted-down with film-forming materials in the same manner as described in connection with the preparation of the sugar-acid crystal blend. The same wetting-down mixture of film-forming material, with or without the monosaccharide, preferably with, as described above, may be used and the proportions of these wetting-down materials, including the limited amounts of water, may be the same as those previously described.

In the wetting-down and mulling operations used in making the sugar-carbonate crystal blend the balance of the coloring material for the beverage is added and if additional flavoring material is desired, some may be added here. Generally, this is not desirable because the bicarbonate affects the character of the flavoring material. Accordingly, only alkali-stable flavoring materials, if any, should be added here.

The thoroughly wetted-down and mulled sugar-carbonate mixture is then dried as described above and the dried product is crumbled to substantially the same size as the sugar-acid crystal blend material described. Each of these dried particles consists essentially of a core comprising a mixture of sugar and carbonate crystals or of sugar crystals or carbonate crystals, colored by, and encased in, a shell or casing of a water-soluble mixture of an edible, film-forming colloid or gum, a monosaccharide sugar and a coloring material. The monosaccharide may be omitted, as in the sugar-acid crystal blend.

As noted in connection with the sugar-acid crystal blend, the hull or casing about the sugar-carbonate crystal blend is stable and does not disintegrate in a moist atmosphere, yet it dissolves readily in cold water. The dried particles are uniformly colored and are free flowing and of a color and character comparable to the dried particles of the sugar-acid crystal blend previously described.

The dried coated particles or granules of the sugar-acid crystal blend and of the sugar-carbonate crystal blend are now uniformly mixed in any conventional drum or other type of mixer and while they are being mixed they are sprayed with the balance of the flavoring materials to be used. In general, these are the more volatile flavoring materials. They are sprayed on the mixed granules, preferably at room temperature, in the form of sprays of essential oils or of dispersions or solutions of such oils in an organic vehicle such as glycerine, propylene glycol and ethyl acetate. The amounts of these materials sprayed on the granules is very small, insufficient to make the powder moist. The thorough mixing of the dried granules in the mixing apparatus is especially desirable since it not only serves to blend the mixed granules in homogeneous admixture, but it serves to distribute the flavor uniformly throughout the granules. The spraying of the flavoring materials on the mixed dry powders serves to activate the hulls or casings about the cores and causes the casings to bind thereto the flavoring material, preventing their release except when the casing is dissolved, as described above. It is preferred that the blending of the granules be carried out in an atmosphere which is substantially free from moisture, although this is not essential. This atmosphere may be ambient air or it may be an inert atmosphere.

Examples of these more volatile flavoring materials are essential oils such as oil of wintergreen, oil of anise and the oils of lemon, orange and lime. Other examples are the synthetic aromatics such as methyl anthranilate and such well-known flavoring materials such as ethyl propionate, propyl butyrate, etc.

The shells, casings or hulls about the crystals and crystal mixtures described above provide the means for preventing a reaction between the reactants until the reaction is desired, and they also provide the means for retaining the desired flavor in the particles. These shells or hulls seal-in the initial, less volatile and more stable flavors. As for the more volatile flavors added in the final mixing operation, they tend to coact with the shells or hulls in some manner not clear to me. In short, the shells or hulls bind on themselves or within themselves the more volatile flavoring materials which are added in the final blending step.

If desired, there may also be added to the dried mixture of granules in the final blending step humectants such as glycerine, propylene glycol, sorbitol, hydrolyzed proteinaceous substances, karaya gum, Irish moss, sodium alginate, etc. These materials may be added in any desired form, preferably non-aqueous form, as a spray upon the mixture of granules as they are being blended in the mixing apparatus. Where a humectant is desired, the essential oils (flavoring) are incorporated in the humectant and the mixture is added to the mixed granules. For a 16 lb. batch of mixed dry granules, for example, approximately 15 cc. of a mixture of equal volumes of essential oils and of glycerine are required to impart the balance of the desired flavor to the product.

It is of course manifest that the quantities of the more volatile flavoring materials and of the humectants which are added to the blend of dried granules as described above may be varied, but these quantities are relatively small and hence, although they are applied in the form of a liquid (which may be a water solution or dispersion), they do not effect a disintegration of the hull or casing about the sugar-acid crystal blend and about the sugar-carbonate crystal blend. Any materials such as water and organic solvents in quantities sufficient to effect a premature breakdown of the hulls about the crystals should be avoided since deterioration of the product will result with such breakdown of the hull structures. The readily soluble hull structures about the crystals are essential to protect the crystals against premature reaction and to insure that they will dissolve quickly when introduced into the proper environment for the beverage, cold water, to release the crystals and permit them to react to form the desired evolution of gas and the desired stable, creamy foam.

The beverages produced by mixing in water the hull-encased sugar-acid crystal blend and the hull-encased sugar-carbonate crystal blend of the present invention are drinks of the so-called "soft drink" variety. These, as is well known, have varying acidities, and the ratios of edible organic acid and of the carbonate necessary to produce the desired acid taste for these drinks are adjusted, as indicated above, in a manner known in the art. Root beer and cream soda are examples of soft drinks which have very little tartness. In making up such drinks, the quantity of edible organic acid used in making up one of the granules described above is slightly in excess of that required to neutralize the carbonate used in making up the other granule. In the case of more tart drinks such as cherry and raspberry, a larger excess of acid is used. And in the case of the drinks of extreme tartness such as a lemon or grapefruit drink, a still larger excess of the acid is used. Beverages which are produced by mixing the granules in cold water (tap water with some ice in it) are better tasting. Additionally, carbonation goes on for a longer period than when relatively warm (tap) water is used.

The following ingredients in the approximate proportions named may be used as described above in making up the granules of the hull-encased sugar-acid crystal blend and the hull-encased sugar-carbonate crystal blend which when mixed in cold water will result in a root beer drink.

While no mention will be made of the various flavoring materials which may be incorporated in these granules as described above, since these are varied widely by various manufacturers, it is to be understood that such flavorings are incorporated in the granules as described above.

32 parts by weight of sucrose, 2 parts by weight of lactose and 8 parts by weight of citric acid are mixed dry and then wetted-down with 1 part by weight of 60% (solids) aqueous extract of the yucca plant and 3 parts by weight of standard commercial caramel color, acid-fast grade, obtainable in the form of a viscous syrup containing caramelized corn sugar and 30% moisture. The hull is then formed about the sugar and acid crystals by mulling and drying, as described. The sugar-carbonate crystal blend is made by combining 10 parts by weight of sodium bicarbonate and 80 parts by weight of sugar and then wetting-down the dry mixture of these ingredients with similar amounts of the Yucca extract and the standard commercial caramel color as described in connection with the sugar-acid blend, and then dried as described. Each blend is separately crumbled and the granules are mixed while they are being sprayed with the balance of the flavoring materials, as described.

If a lemon flavored drink is desired, ordinary refined commercial grade corn syrup is used in lieu of the standard commercial caramel color and the only other substantial change made in connection with the formulation of the root beer drink is a reduction in the amount of sodium bicarbonate from 11 parts by weight to 6 parts by weight. All other proportions of the ingredients are maintained. It is to be understood, of course, that any conventional lemon flavoring material or mixture of such materials may be used, some being added to the wetting-down coating for the sugar-acid blend and the balance to the mixed coated dry granules, as described.

As pointed out above, it is important that the crystals of sugar-acid and of sugar-carbonate be uniformly colored to insure that the resulting beverage will have a uniform color. In making up the root beer drink as described above, the color is provided by the standard commercial caramel color. This caramelized corn syrup serves the additional function of combining with the Yucca extract to form the hull. Where other drinks are made, the required coloring material is added to the mixture of wetting-down materials and applied to the crystals as described. Amaranth is the color conventionally used to provide a cherry color. This material is added in dry powder form to the wetting-down mixture. Other certified dry food colors to provide the desired color in the drink may be used. Examples are tetrazine yellow #5 and F. D. C. Persian orange, etc.

In the preferred product a portion of the sugar content is incorporated with the acid and the balance with the carbonate. If desired, all of the sugar content of the product may be incorporated with the acid and the mixture then coated with the protective casing as described. The carbonate may then be coated with the protective casing and both coated products then mixed and flavored, with or without humectant, as described. It is not necessary to coat the carbonate for the uncoated carbonate may be mixed with the coated sugar-acid blend and the mixture remains stable until incorporated in water.

The dry beverage concentrates of the present invention may be mixed with other edible powders such as whole milk powder, skim milk powder, cream powder, whey powder, etc., in equal proportions or other proportions, as desired. The presence of the concentrate aids in dissolving or dispersing the milk product powders in water and the resulting product is a wholesome, nutritionally rich beverage. Similar nutritionally rich beverages are made by mixing the above described concentrates with cold whole milk or skim milk, with or without ice cream, as desired.

A further variation of my invention is had by mixing the milk product powder with the carbonate, with or without sugar, and then coating the mixture with the film-forming material as described above. When this coated constituent is admixed with the coated sugar-acid constituent and the mixture then mixed with cold water, the mixed constituents, including the milk product component, disperses quickly and uniformly in the water on stirring. In contrast, skim milk powder as obtained commercially does not disperse readily and uniformly in cold water. Beating and/or violent agitation is required to effect dispersion and even after such treatment the dispersion is not always uniform.

I claim:

1. In the method of making a stable, dry, granular beverage concentrate, the steps comprising coating crystals of a sugar of the class consisting of disaccharides, monosaccharides and mixtures thereof and of an edible, water-soluble, low molecular weight food acid with an adherent coating comprising an aqueous dispersion of an edible film-forming material of the class consisting of non-toxic saponins and water-soluble gums, and a monosaccharide, the amount of water in said aqueous dispersion being insufficient to destroy the crystalline character of the sugar and the acid, drying the coated crystals at a temperature below the melting point of the coated crystals to preserve the crystalline structure of the crystals, said drying being continued for a period of time insufficient to destroy the crystals and breaking up the dried product into granules.

2. In the method of making a stable, dry, granular beverage concentrate, the steps comprising coating crystals of a sugar of the class consisting of disaccharides, monosaccharides and mixtures thereof and of an edible, water-soluble, low molecular weight food acid with an adherent coating comprising an aqueous dispersion of an edible film-forming material of the class consisting of non-toxic saponins and water-soluble gums, a monosaccharide, and edible coloring and flavoring materials, the amount of water in said aqueous dispersion being insufficient to destroy the crystalline character of the sugar and the acid, drying the coated crystals at a temperature below the melting point of the coated crystals to preserve the crystalline structure of the crystals, said drying being continued for a period of time insufficient to destroy the crystals and breaking up the dried product into granules.

3. In the method of claim 2 wherein the drying is carried out at a temperature below about 120° F.

4. In the method of making a stable, dry, granular beverage concentrate, the steps comprising coating crystals of a sugar of the class consisting of disaccharides, monosaccharides and mixtures thereof and of an edible, water-soluble, low molecular weight food acid with an adherent coating comprising an aqueous dispersion of an edible film-forming material of the class consisting of non-toxic saponins and water-soluble gums, the amount of water in said aqueous dispersion being insufficient to destroy the crystalline character of the sugar and the acid, drying the coated crystals at a temperature below the melting point of the coated crystals to preserve the crystalline structure of the crystals, said drying being continued for a period of time insufficient to destroy the crystals and breaking up the dried product into granules.

5. In the method of making a stable, dry, granular beverage concentrate, the steps comprising coating a homogeneous mixture of crystals of a sugar of the class consisting of disaccharides, monosaccharides and mixtures thereof and of an edible, water-soluble, low molecular weight food acid with an adherent coating comprising an aqueous dispersion of an edible film-forming material of the class consisting of non-toxic saponins and water-soluble gums, a monosaccharide, and edible coloring and flavoring materials, the amount of water in said aqueous dispersion being insufficient to destroy the crystalline character of the sugar and the acid, drying the coated crystals at a temperature below the melting point of the coated crystals to preserve the crystalline structure of the crystals, and breaking up the dried product into granules.

6. In the method of claim 5 wherein the water vehicle in the aqueous dispersion constitutes about 2% to 5% by weight of the sugar and of the acid and wherein the drying is carried out at a temperature below about 120° F.

7. In the method of making a stable, dry, granular beverage concentrate, the steps comprising coating crystals of granulated sucrose and crystals of an edible organic, water-soluble, low molecular weight food acid with an adherent coating comprising an aqueous dispersion of an edible film-forming material of the class consisting of non-toxic saponins and water-soluble gums, a monosaccharide, and edible coloring and flavoring materials, the amount of water in said aqueous dispersion being insufficient to destroy the crystalline character of the sugar and the acid, drying the coated crystals at a temperature below the melting point of the coated crystals to preserve the crystalline structure of the crystals, and breaking up the dried product into granules.

8. In the method of making a stable, dry, granular beverage concentrate, the steps comprising coating crystals of granulated sugar and of citric acid with an adherent coating comprising an aqueous dispersion of an edible film-forming material of the class consisting of non-toxic saponins and water-soluble gums, a monosaccharide, and edible coloring and flavoring materials, the amount of water in said aqueous dispersion being insufficient to destroy the crystalline character of the sugar and the acid, drying the coated crystals at a temperature below the melting point of the coated crystals to preserve the crystalline structure of the crystals, and breaking up the dried product into granules.

9. In the method of making a stable, dry, granular beverage concentrate, the steps comprising coating a mixture of sugar crystals comprising a major proportion of sucrose and a minor proportion of lactose and citric acid crystals with an adherent coating comprising an aqueous dispersion of an edible film-forming material of the class consisting of non-toxic saponins and water-soluble gums, a monosaccharide, and edible coloring and flavoring materials, the amount of water in said aqueous dispersion being insufficient to destroy the crystalline character of the sugar and the acid, drying the coated crystals at a temperature below the melting point of the coated crystals to preserve the crystalline structure of the crystals, and breaking up the dried product into granules.

10. In the method of clam 9 wherein the water vehicle in the aqueous dispersion constitutes about 2% to 5% by weight of the sugar and acid crystals and wherein the drying is carried out at a temperature below about 120° F.

11. In the method of making a stable, dry, granular beverage concentrate, the steps comprising coating crystals of a sugar of the class consisting of disaccharides, monosaccharides and mixtures thereof and of a non-toxic inorganic carbonate with an adherent coating comprising an aqueous dispersion of an edible film-forming material of the class consisting of non-toxic saponins and water-soluble gums, and a monosaccharide, the amount of water in said aqueous dispersion being insufficient to destroy the crystalline character of the sugar and the carbonate, drying the coated crystals at a temperature below the melting point of the coated crystals to preserve the crystalline structure of the crystals, and breaking up the dried product into granules.

12. In the method of making a stable, dry, granular beverage concentrate, the steps comprising coating crystals of a sugar of the class consisting of disaccharides, monosaccharides and mixtures thereof and of sodium bicarbonate with an adherent coating comprising an aqueous dispersion of an edible film-forming material of the class consisting of non-toxic saponins and water-soluble gums, a monosaccharide and an edible coloring material, the amount of water in said aqueous dispersion being insufficient to destroy the crystalline character of the sugar and the carbonate, drying the coated crystals at a temperature below the melting point of the coated crystals to preserve the crystalline structure of the crystals, and breaking up the dried product into granules.

13. The method of making a stable, dry, granular beverage concentrate comprising blending into a homogeneous mixture the granular product produced by the method of claim 1 and granules of a non-toxic inorganic carbonate.

14. A stable, dry, granular beverage concentrate constituent comprising crystals of a sugar of the class consisting of disaccharides, monosaccharides and mixtures thereof and crystals of an edible, water-soluble, low molecular weight food acid, said crystals being encased in a readily water-soluble hull comprising an edible film-forming material of the class consisting of non-toxic saponins and water-soluble gums.

15. A stable, dry, granular beverage concentrate constituent comprising crystals of a sugar of the class consisting of disaccharides, monosaccharides and mixtures thereof and crystals of an edible, water-soluble, low molecular weight food acid, said crystals being encased in a uniformly colored and flavored, readily water-soluble hull comprising an edible film-forming material of the class consisting of non-toxic saponins and water-soluble gums.

16. A stable, dry, granular beverage concentrate constituent comprising crystals of a sugar of the class consisting of disaccharides, monosaccharides and mixtures thereof and crystals of an edible, water-soluble, low molecular weight food acid, said crystals being encased in a uniformly colored and flavored, readily water-soluble hull comprising an edible film-forming material of the class consisting of non-toxic saponins and water-soluble gums, and a monosaccharide.

17. A stable, dry, granular beverage concentrate constituent comprising sucrose crystals and citric acid crystals, said crystals being encased in a uniformly colored and flavored, readily water-soluble hull comprising Yucca plant extract and dextrose.

18. A stable, dry, granular beverage concentrate constituent comprising sucrose crystals and citric acid crystals, said crystals being encased in a uniformly colored and flavored, readily water-soluble hull comprising a non-toxic saponin and dextrose.

19. A stable, dry, granular beverage concentrate constituent comprising sucrose and lactose crystals and citric acid crystals, said crystals being encased in a uniformly colored and flavored, readily water-soluble hull comprising a non-toxic saponin and dextrose.

20. A stable, dry, granular beverage concentrate constituent comprising crystals of a sugar of the class consisting of disaccharides, monosaccharides and mixtures thereof and crystals of a non-toxic inorganic carbonate, said crystals being encased in a readily water-soluble hull comprising an edible film-forming material of the class consisting of non-toxic saponins and water-soluble gums.

21. A stable, dry, granular beverage concentrate constituent comprising crystals of a sugar of the class consisting of disaccharides, monosaccharides and mixtures thereof and crystals of a non-toxic inorganic carbonate, said crystals being encased in a uniformly colored and flavored, readily water-soluble hull comprising an edible film-forming material of the class consisting of non-toxic saponins and water-soluble gums, and a monosaccharide.

22. A stable, dry, granular beverage concentrate constituent comprising sucrose crystals and sodium bicarbonate crystals, said crystals being encased in a uniformly colored and flavored, readily water-soluble hull comprising a non-toxic saponin and dextrose.

23. A stable, dry, granular beverage concentrate comprising a homogeneous mixture of (1) a constituent comprising crystals of a sugar of the class consisting of disaccharides, monosaccharides and mixtures thereof and crystals of an edible, water-soluble, low molecular weight food acid, said crystals being encased in a readily water-soluble hull comprising an edible film-forming material of the class consisting of non-toxic saponins and water-soluble gums and (2) a constituent comprising crystals of a sugar of the class consisting of disaccharides, monosaccharides and mixtures thereof and crystals of a non-toxic inorganic carbonate, said crystals being encased in a readily water-soluble hull comprising an edible film-forming material of the class consisting of non-toxic saponins and water-soluble gums.

24. A stable, dry, granular beverage concentrate comprising a homogeneous mixture of (1) a constituent comprising crystals of a sugar of the class consisting of disaccharides, monosaccharides and mixtures thereof and crystals of an edible, water-soluble, low molecular weight food acid, said crystals being encased in a uniformly colored and flavored, readily water-soluble hull comprising an edible film-forming material of the class consisting of non-toxic saponins and water-soluble gums, and a monosaccharide, and (2) a constituent comprising crystals of a sugar of the class consisting of disaccharides, monosaccharides and mixtures thereof and crystals of an inorganic carbonate, said crystals being encased in a uniformly colored and flavored, readily water-soluble hull comprising an edible film-forming material of the class consisting of non-toxic saponins and water-soluble gums, and a monosaccharide.

25. A stable, dry, granular beverage concentrate comprising a homogeneous mixture of (1) a constituent comprising sucrose and lactose crystals and citric acid crystals, said crystals being encased in a uniformly colored and flavored, readily water-soluble hull comprising a non-toxic saponin and dextrose, and (2) a constituent comprising sucrose crystals and sodium bicarbonate crystals, said crystals being encased in a uniformly colored and flavored, readily water-soluble hull comprising a non-toxic saponin and dextrose.

26. A stable, dry, granular beverage concentrate comprising a homogeneous mixture of (1) a constituent comprising crystals of a sugar of the class consisting of disaccharides, monosaccharides and mixtures thereof and crystals of an edible, water-soluble, low molecular weight food acid, said crystals being encased in a uniformly colored and flavored, readily water-soluble hull comprising an edible film-forming material of the class consisting of non-toxic saponins and water-soluble gums, and a monosaccharide, (2) a constituent comprising crystals of a sugar of the class consisting of disaccharides, monosaccharides and mixtures thereof and crystals of a non-toxic inorganic carbonate, said crystals being encased in a uniformly colored and flavored, readily-water-soluble hull comprising an edible film-forming material of the class consisting of nontoxic saponins and water-soluble gums, and a monosaccharide and (3) a milk material of the class consisting of whole milk, skim milk, whole milk powder, skim milk powder, cream powder and whey powder.

27. A stable, dry, granular beverage concentrate comprising a homogeneous mixture of (1) a constituent comprising crystals of a sugar of the class consisting of disaccharides, monosaccharides and mixtures thereof and crystals of an edible, water-soluble, low molecular weight food acid, said crystals being encased in a uniformly colored and flavored, readily water-soluble hull comprising an edible film-forming material of the class consisting of non-toxic saponins and water-soluble gums, and a monosaccharide and (2) a non-toxic inorganic carbonate.

28. A stable, dry, granular beverage concentrate constituent comprising sucrose crystals and citric acid crystals, said crystals being encased in a uniformly colored and flavored, readily water-soluble hull comprising Yucca plant extract.

29. A stable, dry, granular beverage concentrate constituent comprising sucrose crystals and sodium bicarbonate crystals, said crystals being encased in a uniformly colored and flavored, readily water-soluble hull comprising Yucca plant extract.

30. A stable, dry, granular beverage concentrate comprising a homogeneous mixture of (1) a constituent comprising sucrose crystals and citric acid crystals, said crystals being encased in a uniformly colored and flavored, readily water-soluble hull comprising Yucca plant extract and (2) a constituent comprising sucrose crystals and sodium bicarbonate crystals, said crystals being encased in a uniformly colored and flavored, readily water-soluble hull comprising Yucca plant extract.

31. The method of making a stable, dry, granular beverage concentrate comprising a homogeneous mixture of a first and second constituent, said method comprising (1) making a first constituent by a process comprising coating crystals of a sugar of the class consisting of disaccharides, monosaccharides and mixtures thereof and of an edible food, water-soluble, low molecular weight acid with an adherent coating comprising an aqueous dispersion of an edible film-forming material of the class consisting of non-toxic saponins and water-soluble gums, a monosaccharide, and edible coloring and flavoring materials, the amount of water in said aqueous dispersion being insufficient to destroy the crystalline character of the sugar and the acid, drying the coated crystals at a temperature below the melting point of the coated crystals to preserve the crystalline structure of the crystals, said drying being continued for a period of time insufficiently to destroy the crystals and breaking up the dried product into granules, (2) making a second constituent by a process comprising coating crystals of a sugar of the class consisting of disaccharides, monosaccharides and mixtures thereof and of an inorganic carbonate with an adherent coating comprising an aqueous dispersion of an edible film-forming material of the class consisting of non-toxic saponins and water-soluble gums, and a monosaccharide, the amount of water in said aqueous dispersion being insufficient to destroy the crystalline character of the sugar and the carbonate, drying the coated crystals at a temperature below the melting point of the coated crystals to preserve the crystalline structure of the crystals, and breaking up the dried product into granules, and mixing the two granular constituents.

32. A stable, dry, granular beverage concentrate comprising a homogeneous mixture of (1) a constituent comprising sucrose crystals and crystals of an edible, water-soluble, low molecular weight food acid, said crystals being encased in a uniformly colored and flavored, readily water-soluble hull comprising Yucca plant extract and licorice and (2) a constituent comprising sucrose crystals and sodium bicarbonate crystals, said crystals being encased in a uniformly colored and flavored, readily water-soluble hull comprising Yucca plant extract and licorice.

33. A stable, dry, granular beverage concentrate constituent comprising sucrose crystals and crystals of an edible, water-soluble, low molecular weight food acid, said crystals being encased in a uniformly colored and flavored, readily water-soluble hull comprising Yucca plant extract, licorice and dextrose.

34. A stable, dry, granular beverage concentrate constituent comprising sucrose crystals and crystals of an edible, water-soluble, low molecular weight food acid, said crystals being encased in a uniformly colored and flavored, readily water-soluble hull comprising licorice and dextrose.

35. A stable, dry, granular beverage concentrate constituent comprising sucrose crystals and crystals of an edible, water-soluble, low molecular weight food acid, said crystals being encased in a uniformly colored and flavored, readily water-soluble hull comprising Yucca plant extract and licorice.

36. A stable, dry, granular beverage concentrate constituent comprising sucrose crystals and crystals of an edible, water-soluble, low molecular weight food acid, said crystals being encased in a uniformly colored and flavored, readily water-soluble hull comprising licorice.

References Cited in the file of this patent
UNITED STATES PATENTS

| | | |
|---|---|---|
| 362,727 | Divine | May 10, 1887 |
| 2,071,841 | Kelling | Feb. 23, 1937 |
| 2,404,763 | Gaver | July 23, 1946 |
| 2,603,569 | Alther et al. | July 15, 1952 |
| 2,639,238 | Alther et al. | May 19, 1953 |